United States Patent
Jones et al.

(10) Patent No.: US 8,881,030 B2
(45) Date of Patent: Nov. 4, 2014

(54) SYSTEM AND METHOD FOR ENHANCING SOCIALIZATION IN VIRTUAL WORLDS

(75) Inventors: Allan Jones, Valencia, CA (US); Steve Parkis, Valencia, CA (US)

(73) Assignee: Disney Enterprises, Inc., Burbank, CA (US)

( * ) Notice: Subject to any disclaimer, the term of this patent is extended or adjusted under 35 U.S.C. 154(b) by 496 days.

(21) Appl. No.: 12/583,756

(22) Filed: Aug. 24, 2009

(65) Prior Publication Data

US 2011/0047486 A1 Feb. 24, 2011

(51) Int. Cl.
| | |
|---|---|
| *G06F 3/048* | (2013.01) |
| *G06F 3/00* | (2006.01) |
| *A63F 13/30* | (2014.01) |
| *G06Q 30/02* | (2012.01) |
| *H04L 29/06* | (2006.01) |

(52) U.S. Cl.
CPC ........... *A63F 13/12* (2013.01); *A63F 2300/572* (2013.01); *G06Q 30/02* (2013.01); *H04L 67/38* (2013.01)
USPC ............................ 715/757; 715/706; 715/744

(58) Field of Classification Search
USPC ................................... 715/757; 709/203, 206
See application file for complete search history.

(56) References Cited

U.S. PATENT DOCUMENTS

| | | | |
|---|---|---|---|
| 5,880,731 A | 3/1999 | Liles | |
| 5,907,328 A * | 5/1999 | Brush, II et al. | 715/863 |
| 7,396,281 B2 | 7/2008 | Mendelsohn | |
| 2004/0001086 A1 * | 1/2004 | Brown et al. | 345/744 |
| 2004/0111479 A1 | 6/2004 | Borden | |
| 2007/0002057 A1 * | 1/2007 | Danzig et al. | 345/473 |
| 2007/0113181 A1 | 5/2007 | Blattner | |

(Continued)

FOREIGN PATENT DOCUMENTS

| | | |
|---|---|---|
| JP | 2005-202909 | 7/2005 |
| WO | WO 2001/40893 | 6/2001 |
| WO | WO2008024705 | 2/2008 |
| WO | WO 2008/106196 | 9/2008 |

OTHER PUBLICATIONS

A. Goldberg, "Improv: A System for Real-Time Animation of Behavior-Based Interactive Synthetic Actors", *Lecture Notes in Artificial Intelligence* vol. 1195, R. Trappl P. Petta (Eds.), 1997 <http://www.athomasgoldberg.net/sitebuildercontent/sitebuilderfiles/lnai.pdf>.

The Forum—an overview, Retrieved from Internet <http://www.dcs.qmw.ac.uk/research/distrib/ Mushroom/workshop/final- papers/BT.pdf>, 1999 BT Laboratories.

Wyld, David C., "Government in 3D: How Public Leaders Can Draw on Virtual Worlds", 2008 Southeastern Louisiana University, Retrieved from the Internet <http://www.businessofgovernment.org/pdfs/Wyld3dReport.pdf>.

(Continued)

*Primary Examiner* — Stephen Alvesteffer
(74) *Attorney, Agent, or Firm* — Farjami & Farjami LLP

(57) ABSTRACT

There is provided a system and method for inducing a reply from a first client connected to a virtual world to facilitate a social interaction using a second client connected to the virtual world. There is provided a method for inducing a reply from a first client connected to a virtual world to facilitate a social interaction using a second client connected to the virtual world, the method comprising locating, in the virtual world, an avatar of the second client in a proximity of an avatar of the first client, executing a social action using the avatar of the second client such that the social action is observable by the first client but not observable by the second client, receiving the reply from the first client in response to the social action, and rendering the reply from first client using the avatar of the first client.

20 Claims, 4 Drawing Sheets

(56) References Cited

U.S. PATENT DOCUMENTS

| | | |
|---|---|---|
| 2008/0091692 A1 | 4/2008 | Keith |
| 2008/0215994 A1 | 9/2008 | Harrison |
| 2009/0147008 A1* | 6/2009 | Do et al. ............... 345/473 |
| 2009/0164919 A1* | 6/2009 | Bates et al. ............ 715/757 |
| 2009/0251471 A1* | 10/2009 | Bokor et al. ........... 345/474 |
| 2009/0282472 A1* | 11/2009 | Hamilton et al. ....... 726/15 |
| 2010/0018382 A1* | 1/2010 | Feeney et al. .......... 84/615 |
| 2010/0153499 A1* | 6/2010 | Dawson et al. ......... 709/206 |
| 2010/0185640 A1* | 7/2010 | Dettinger et al. ....... 707/758 |

OTHER PUBLICATIONS

Vilhjálmsson, et al. "BodyChat: Autonomous Communicative Behaviors in Avatars", 1998 Retrieved from Internet < http://www.media.mit.edu/gnl/publications/agents98.pdf >.

Vilhjálmsson, Hannes Högni "Animating Conversation in Online Games", Retrieved from Internet <http://citeseerx.ist.psu.edu/viewdoc/download?doi=10.1.1.101.645&rep=rep1&type=pdf>, 2004.

* cited by examiner

Fig. 3
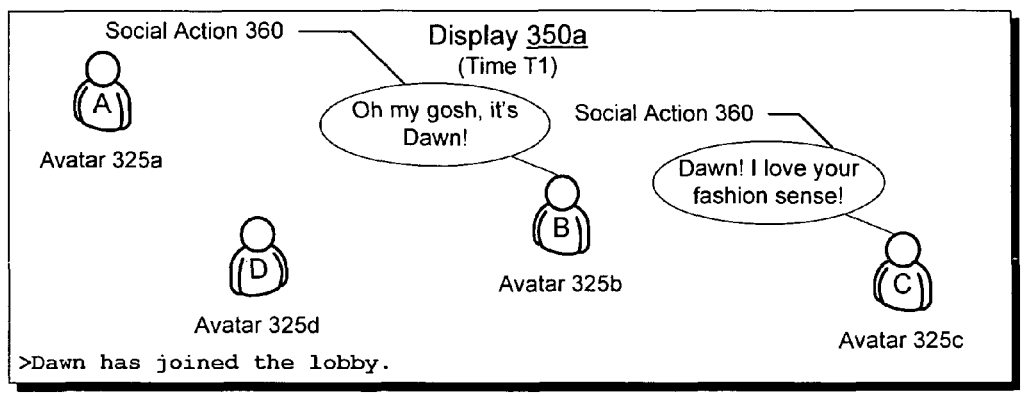
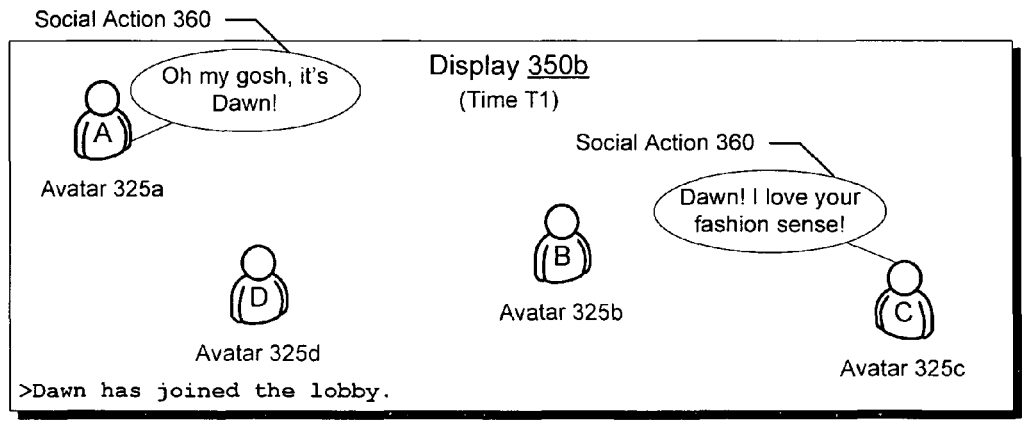
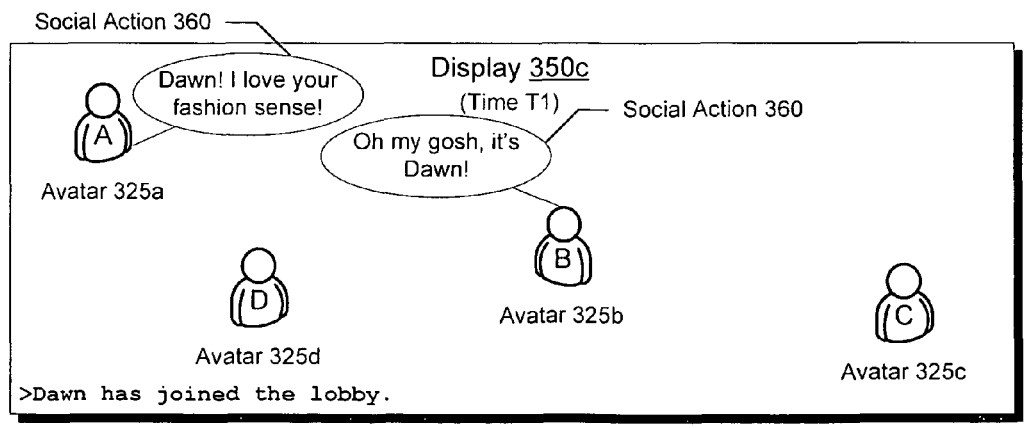

SYSTEM AND METHOD FOR ENHANCING SOCIALIZATION IN VIRTUAL WORLDS

BACKGROUND OF THE INVENTION

1. Field of the Invention

The present invention relates generally to virtual worlds. More particularly, the present invention relates to social interaction in virtual worlds.

2. Background Art

With the increased popularity of computers and the Internet, online applications are occupying more leisure time for many people, particularly for younger generations comfortable with technology. In particular, social communications are increasingly taking place over networks rather than in person, such as e-mail, text messages, web forums, and online gaming such as virtual worlds. Many virtual worlds also emphasize social aspects of gameplay along with traditional achievement and skill-based gameplay. In this manner, besides being entertained by the virtual world, people can enjoy additional benefits from fostering online friendships and social relations.

However, it may still be difficult for some people to establish these online social relationships, particularly if their natural disposition is towards shyness or introspection. While using a computer may lessen some of the normal pressures that might otherwise be experienced in a face-to-face social encounter, it still requires some courage and initiative to initiate an online conversation or to solicit an online gaming partner. Without making that first step, people may miss many of the opportunities and benefits that online social interactivity has to offer.

Accordingly, there is a need to overcome the drawbacks and deficiencies in the art by providing a way for people to engage more easily in social interactivity within online contexts such as virtual worlds.

SUMMARY OF THE INVENTION

There are provided systems and methods for enhancing socialization in virtual worlds, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 3 presents a diagram showing the display of clients participating in the facilitation of a social interaction, according to another embodiment of the present invention.

DETAILED DESCRIPTION OF THE INVENTION

The present application is directed to a system and method for inducing a reply from a first client connected to a virtual world to facilitate a social interaction using a second client connected to the virtual world. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
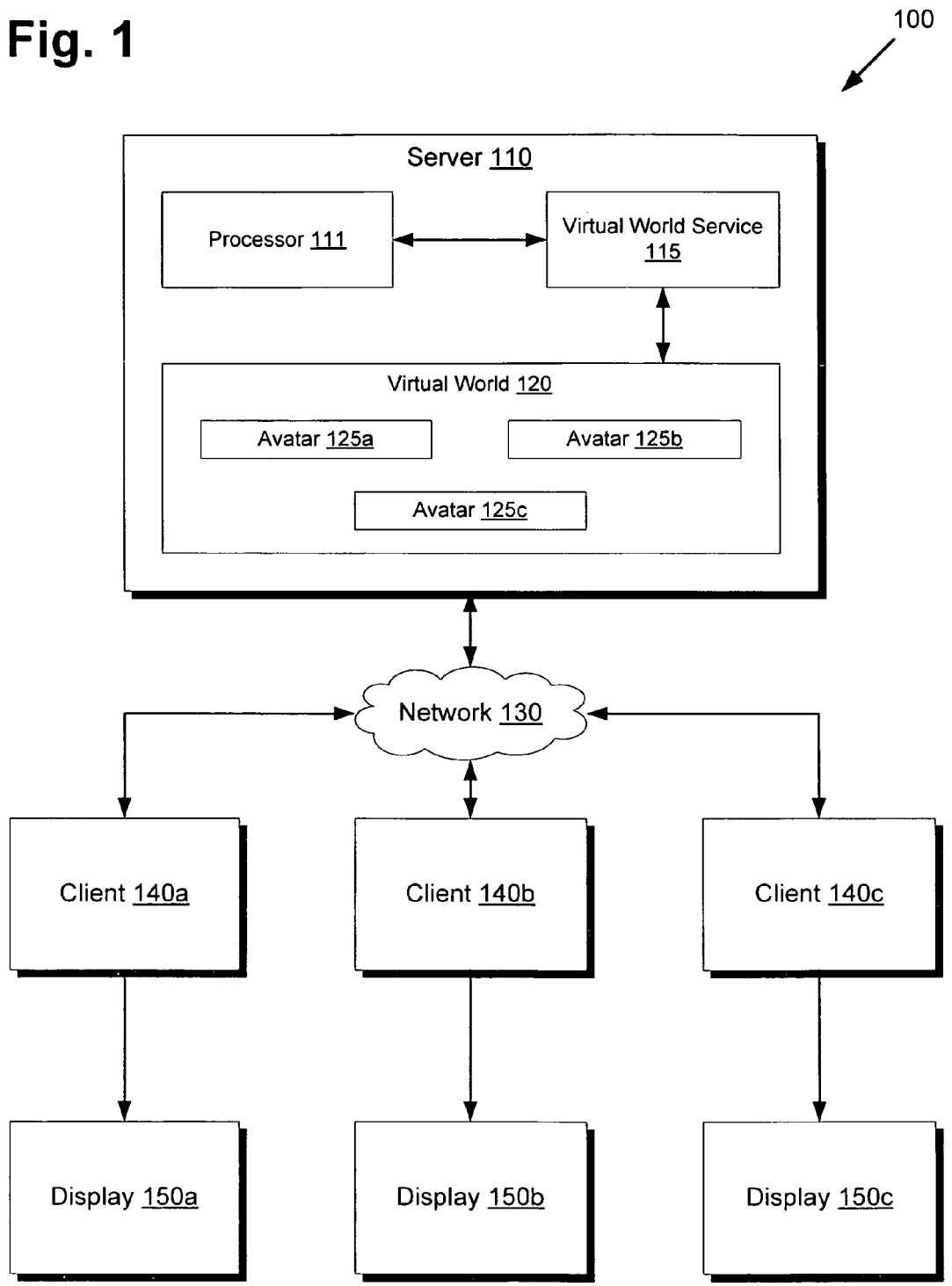
FIG. 1 presents a diagram of a network supporting a virtual world, according to one embodiment of the present invention.

FIG. 1 presents a diagram of a network supporting a virtual world, according to one embodiment of the present invention. Diagram 100 of FIG. 1 includes server 110, network 130, clients 140a-140c, and displays 150a-150c. Server 110 includes processor 111, virtual world service 115, and virtual world 120. Virtual world 120 includes avatars 125a-125c being under the control of clients 140a-140c, respectively.

FIG. 1 presents an overview of an exemplary network for supporting an online application, or virtual world service 115. As shown in FIG. 1, clients 140a-140c each connect to server 110 via network 130. Network 130 may comprise a publicly accessible network such as the Internet. Processor 111 of server 110 may execute virtual world service 115 to provide access to virtual world 120. As shown in FIG. 1, virtual world 120 contains avatars 125a-125c, which correspond to virtual representations of clients 140a-140c, respectively. Clients 140a-140c may each comprise, for example, a desktop or laptop computer, a game console, a mobile phone, a portable media player, or any other device capable of connecting to server 110 via network 130 and outputting video to displays 150a-150c, respectively. For example, each of clients 140a-140c may be executing a client virtual world program or a web browser that accesses and interfaces with virtual world service 115 running on server 110. The client virtual world programs or web browsers may then render virtual world 120 on displays 150a-150c for observing by the users of clients 140a-140c.

Although only one server and three clients are depicted in FIG. 1, alternative embodiments may use several servers and support many more than three clients concurrently. Multiple servers may be provided for load balancing, optimum network locality, redundancy, and other reasons, whereas many clients may be connected concurrently to support massively multiplayer online (MMO) gameplay. However, for reasons of clarity and simplicity, the network configuration shown in FIG. 1 shall be adopted for explanatory purposes.

Figure 2:
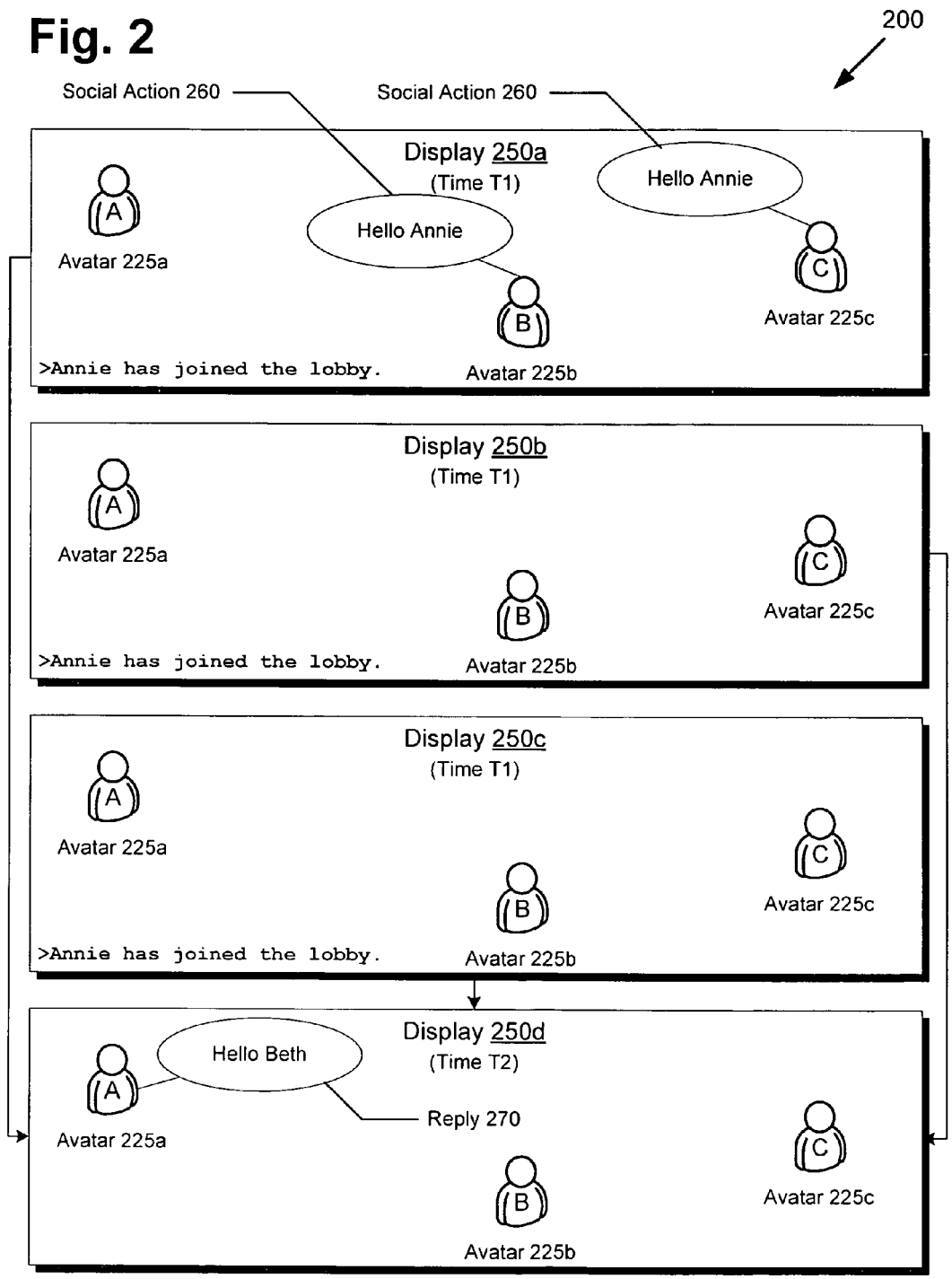
FIG. 2 presents a diagram showing the display of clients participating in the facilitation of a social interaction, according to one embodiment of the present invention.

Moving to FIG. 2, FIG. 2 presents a diagram showing the display of clients participating in the facilitation of a social interaction, according to one embodiment of the present invention. Diagram 200 of FIG. 2 includes display 250a-250d. Display 250a includes avatars 225a-225c and social action 260. Display 250b includes avatars 225a-225c. Display 250c includes avatars 225a-225c. Display 250d includes avatars 225a-225c and reply 270. With respect to FIG. 2, it should be noted that display 250a corresponds to display 150a from FIG. 1, that display 250b corresponds to display 150b, that display 250c corresponds to display 150c, and that display 250d corresponds to display 150a. Displays 250a-

250c show the state of virtual world 120 from FIG. 1 at a time T1, whereas display 250d shows the state of virtual world 120 at a time T2.

At time T1, the avatar Annie represented by avatar 225a joins a public lobby area, as shown by the join message at the bottom of displays 250a-250c. However, the user controlling Annie, or the user of client 140a in FIG. 1, may not be inclined towards making a first contact with other avatars due to a shy and introverted personality. Thus, to facilitate social interactivity, virtual world service 115 executing on processor 111 of server 110 in FIG. 1 may temporarily control one or more avatars of other users within proximity of avatar 225a to simulate a social action such as a personalized greeting, creating an impression of a friendly and outgoing community. This is shown in FIG. 2 on display 250a as social action 260, where avatars 225b-225c convey the personalized text greeting, "Hello Annie." Besides text communication, social action 260 might also comprise voice communication, avatar movements, and other actions, singly or in combination. For example, as shown on display 250a, avatars 225b-225c may change orientation to face avatar 225a during social action 260, and return to their original orientation after the completion of social action 260. Other avatar movements might include gestures such as waving, bowing, beckoning, dancing, showing emotions via emoticons, and any other movements or actions permitted by virtual world service 115. Furthermore, social action 360 might be invoked at staggered or random times for different controlled avatars, which may appear to look more like human behavior rather than simulated behavior.

Since social action 260 is merely simulated by processor 111 using virtual world service 115 and not actually initiated by corresponding clients 140b-140c, the corresponding displays 250b-250c for clients 140b-140c show the public lobby as if nothing happened, as depicted in FIG. 2. In alternative embodiments, however, the execution of social action 260 by other controlled avatars might be shown as well. For example, display 250b might show avatar 225c saying "Hello Annie" whereas display 250c might show avatar 225b saying "Hello Annie." A decision to hide social action 260 from the display of all avatars except avatar 225a, to hide only from a corresponding display of a controlled avatar, or to hide by some other criteria may be flexibly formulated as desired, as long as the simulation of social action 260 is kept protected from users' consciousness.

As shown by display 250a in FIG. 2, clients 140b-140c may thus remain unaware that social action 260 has been simulated, whereas client 140a can fully perceive social action 260. In this manner, the user of Annie or avatar 225a might feel more comfortable engaging in a conversation or another social activity with other avatars. Meanwhile, the users of avatars 225b-225c do not need to personally initiate a social interaction with avatar 225a, since social action 260 is simulated for them by virtual world service 115. As long as this simulation remains undetected by users, online community cohesiveness may be enhanced with little penalty and minimal effort. Even if users detect the simulation, the simulated social action may appear so innocuous that users might concede that their avatars have been used for the greater good of fostering a robust online community.

Before intervening in such a manner, processor 111 might first determine whether controlling the avatars is acceptable according to one or more factors. For example, virtual world service 115 might keep a behavior history for each avatar, allowing processor 111 to determine whether particular avatars have exhibited problematic social behavior in the past. Positive behaviors such as helping fellow avatars might add points to a behavior variable, whereas negative behaviors such as harassment might subtract points to the behavior variable. Processor 111 might then consider a behavior filter as a factor to remove from consideration any avatars having a low behavior variable, since they may not be ideal candidates for encouraging social interactions. This could apply both to avatars as candidates for simulated control, or avatars 225b-225c in FIG. 2, and avatars as candidates for receiving a simulated social action, or avatar 225a in FIG. 2.

Several other factors may also be considered besides avatar behavior. For example, to avoid excessive simulated actions that might make the user of avatar 225a suspicious of system intervention, the frequency of simulated social actions might be moderated based on an upper limit, random chance, or other criteria. To help new users get up and running quickly in the virtual world, recently registered avatars without any established online friends might be targeted for simulated social actions more frequently than long established avatars with fully populated buddy lists. In this manner, simulated social actions can provide efficient returns in establishing a robust and friendly online community while minimizing the risk of users discovering the simulated nature of the social actions.

Assuming that processor 111 has determined that avatar 225a is an appropriate target for receiving a simulated social action, processor 111 may then consult virtual world service 115 to determine avatars in proximity to avatar 225a in virtual world 120 of FIG. 1. One simple method of determining avatars in proximity to a particular avatar is to confirm that the avatars are visible on the display of a client associated with the particular avatar. Thus, since avatars 225b-225c are visible on display 250a, it may be concluded that avatars 225b-225c are within proximity to avatar 225a. As with avatar 225a, one or more factors could be applied against avatars 225b-225c to determine whether they are suitable candidates for simulating social action 260. Assuming processor 111 determines that both avatar 225b, or Beth, and avatar 225c, or Carl, are acceptable candidates, then both avatars 225b-225c may be used to execute social action 260, as shown in display 250a. As shown in FIG. 2, social action 260 is observable by client 140a of avatar 225a, but not observable by clients 140b-140c of avatars 225b-225c. That is, whereas Annie sees avatars 225b-225c sending a personalized text greeting on display 250a, Beth and Carl do not see any action occurring on displays 250b-250c.

After the completion of social action 260, which may for example display for a few seconds, the state of virtual world 120 may transition to the state shown in display 250d at time T2. Since the simulation of social action 260 is complete at time T2, all users may observe the same display 250d as usual when no social actions are being simulated. Additionally and ideally, the user of client 140a may also send a reply in response to social action 260. Display 250d shows one example reply 270 that might be received by processor 111. Since the user of client 140a might be more inclined to respond to avatar 225b or Beth as she is closer than avatar 225c or Carl, reply 270 comprises a return greeting to avatar 225b, "Hello Beth."

Recalling that the user controlling avatar 225b or Beth did not observe the original social action 260, as shown by display 250b at time T1, reply 270 appears to be a first initiating communication from the perspective of the user controlling avatar 225b or Beth. From the perspective of avatar 225b, it appears that avatar 225a is initiating the conversation when in reality it was the simulated social action 260 that prompted avatar 225a to formulate reply 270. Additionally, since the user of avatar 225c, or Carl, was never aware of the existence of social action 260 in the first place, the lack of any specific reply from avatar 225a does not raise any concerns for the user of avatar 225c. In this manner, users that are normally reticent to reach out and take the initiative in breaking the ice and acting socially confident and assertive may be assisted transparently with the help of a few simulated social actions.

For social action 260 to continue undetected as the real social interaction starter, reply 270 should appear to avatar 225b to be a natural first initiating action even if social action 260 never occurred, since the user of avatar 225b indeed never observed social action 260. Thus, it may be helpful to formulate social action 260 to include a simple universal greeting so that reply 270 can also include the greeting as a response. As shown by social action 260, the greeting "Hello" is used as such a simple universal greeting, as a typical reply to "Hello" may simply comprise repeating "Hello" back. However, just using the greeting in isolation may leave little impact, as it may be unclear whom the greeting is directed towards. Thus, adding personalization when formulating social action 260 may provide a stronger impact for avatar 225a. In FIG. 2, personalization is accomplished by including the specific name of avatar 225a, or "Annie," but other methods of personalization could be used as well. This in turn may help shape reply 270 such that it is directed towards a particular avatar that was used for social action 260.

As shown in reply 270 of FIG. 2, the name of avatar 225b, or "Beth," is specifically included within the return greeting of "Hello," making it clear that avatar 225a is responding to avatar 225b. This is particularly helpful since the user of avatar 225b is unaware of the previous context of social action 260, further helping to keep the role of social action 260 in the social interaction well hidden. Hopefully, avatar 225b may then naturally continue the flow of the conversation, replying with, for example, "How are you doing?" or "What's up?" In this manner, a casual conversation starter might lead to a lasting online friendship, which may have never otherwise occurred without the initial help of social action 260.

While the example shown in FIG. 2 is such that the avatars that are already in the public lobby are controlled to greet the joining avatar 225a, a reverse scenario could also be used as well. For example, as soon as avatar 225a enters the public lobby, virtual world service 115 might control avatar 225a such that it says "Hello everybody" or "Hello Beth" upon entering, without the user of client 140a ever observing or made aware that avatar 225a is greeting anyone. As a result of the simulated greeting, avatar 225b or avatar 225c might reply with "Hello Annie" and the conversation may proceed as described above.

Moving to FIG. 3, FIG. 3 presents a diagram showing the display of clients participating in the facilitation of a social interaction, according to another embodiment of the present invention. Diagram 300 of FIG. 3 includes displays 350a-350c. Display 350a includes avatars 325a-325d and social action 360. Display 350b includes avatars 325a-325d and social action 360. Display 350c includes avatars 325a-325d and social action 360. With regards to FIG. 3, it should be noted that display 350a corresponds to display 150a from FIG. 1, that display 350b corresponds to display 150b, and that display 350c corresponds to display 150c. Displays 350a-350c show the state of virtual world 120 from FIG. 1 at a time T1.

While FIG. 2 focused on an example of starting a conversation between specifically selected avatars, FIG. 3 demonstrates an example where the focus is more aimed towards general community enhancement directed towards a specific context or event. In the case of FIG. 3, the specific context or event is the entrance of a well-known celebrity avatar "Dawn" who might be known for her good fashion sense. To emphasize this point and to generate buzz and excitement for a user, virtual world service 115 might control avatars of other users to reinforce Dawn's celebrity image.

For example, as shown in FIG. 3, virtual world service 115 of FIG. 1 may simulate a social action 360 such that each user observes other avatars talking about avatar 325, or Dawn, that just entered the public lobby. Client 140a viewing corresponding display 350a sees avatar 325b and avatar 325c executing social action 360, whereas client 140b viewing corresponding display 350b sees avatar 325a and avatar 325c executing social action 360, and client 140c viewing corresponding display 350c sees avatar 325a and avatar 325b executing social action 360. Social action 360 may comprise a phrase for drawing attention to Dawn, which might be selected from a list of previously prepared phrases, including "Oh my gosh, it's Dawn!" and "Dawn! I love your fashion sense!" as shown in FIG. 3.

As a result, for example, the user of client 140a controlling avatar 325a may wonder what the buzz surrounding Dawn is all about and decide to reply by, for example, communicating her own comment to the chorus, striking up a conversation with avatar 325d, or asking avatar 325b or avatar 325c for more information about Dawn. Similarly, the user of clients 140b and 140c controlling avatars 325b and 325c may come up with their own responses to the apparent commotion that seems to be surrounding Dawn, which of course was only simulated by virtual world service 115 in FIG. 1. If users are generating comments on their own initiative, then it may not be necessary for virtual world service 115 to invoke social action 360 as shown in FIG. 3, or social action 360 may only be selectively applied to particular avatars that have not yet responded to the entrance of avatar 325d to the public lobby.

In this manner, specific events or contexts may be controlled to enhance the user experience. For example, there might be a festival or party occurring in virtual world 120 of FIG. 1, but avatars 125a-125c might be too shy to participate in the festive spirit and might just idly stand there. As a result, if virtual world service 115 detects that the party is going a bit dull, then it might control the behavior of some avatars to jumpstart the party. For example, avatar 125a might see avatar 125b saying "Let's dance!" and avatar 125c starting to dance, when in actuality virtual world service 115 is simulating avatar 125b saying "Let's dance" and avatar 125c dancing. Virtual world service 115 may provide a similar illusion for avatar 125b and avatar 125c, so that users might begin to feel the festive spirit and begin participating in a more context or event appropriate manner, which enhances the experience for everyone. Once the festival or party goes into full swing then virtual world service 115 may stop simulating, as the objective of lifting everyone's mood and jumpstarting the party is already complete.

Figure 4:
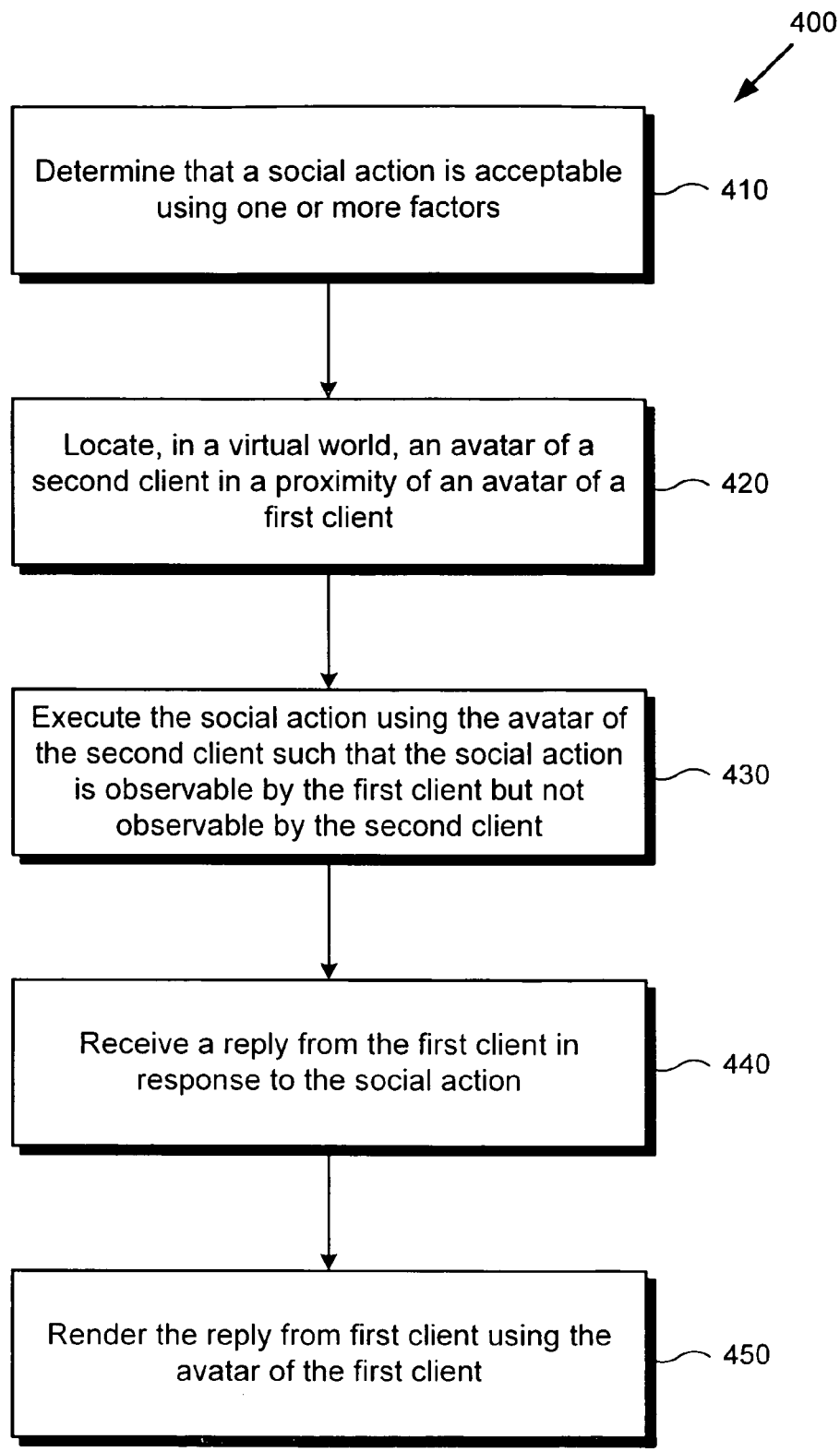
FIG. 4 shows a flowchart describing the steps, according to one embodiment of the present invention, by which a reply may be induced from a first client connected to a virtual world to facilitate a social interaction using a second client connected to the virtual world.

Moving to FIG. 4, FIG. 4 shows a flowchart describing the steps, according to one embodiment of the present invention, by which a reply may be induced from a first client connected to a virtual world to facilitate a social interaction using a second client connected to the virtual world. Certain details and features have been left out of flowchart 400 that are apparent to a person of ordinary skill in the art. For example, a step may comprise one or more substeps or may involve specialized equipment or materials, as known in the art. While steps 410 through 450 indicated in flowchart 400 are sufficient to describe one embodiment of the present invention, other embodiments of the invention may utilize steps different from those shown in flowchart 400.

Referring to step 410 of flowchart 400 in FIG. 5, diagram 100 of FIG. 1, and diagram 200 of FIG. 2, step 410 of flowchart 400 comprises processor 111 determining that social action 260 is acceptable using one or more factors. As previously discussed, these factors might include avatar behavioral histories, simulation frequency, user registration dates, buddy lists, and other data. Furthermore, these factors may be weighed against both the avatars executing social action 260 and the avatars receiving the effects of social action 260.

Referring to step 420 of flowchart 400 in FIG. 5 and diagram 100 of FIG. 1, step 420 of flowchart 400 comprises processor 111 locating in virtual world 120 an avatar 125b of client 140b in proximity of an avatar 125a of client 140a. As previously discussed, one method of determining proximity is whether an avatar is visible on a corresponding client display. Turning to FIG. 2, both avatar 225b and avatar 225c are in proximity to avatar 225a since they are both visible on display 250a. Thus, step 420 may select avatar 225b or avatar 225c, or both as depicted in FIG. 2. For the purposes of the present example, it might be assumed that only avatar 225b is selected.

Referring to step 430 of flowchart 400 in FIG. 5, diagram 100 of FIG. 1, and diagram 200 of FIG. 2, step 430 of flowchart 400 comprises processor 111 executing social action 260 using avatar 225b such that social action 260 is observable by client 140a but not observable by client 140b. As shown in FIG. 2, step 430 may be accomplished by changing what is shown on each client's corresponding display. Thus, display 250a corresponding to client 140a shows avatar 225b executing social action 260, whereas display 250b corresponding to client 140b does not show avatar 225b executing social action 260. As a result, the user of client 140a can perceive social action 260, or the communication of "Hello Annie," whereas the user of client 140b cannot perceive social action 260. In one embodiment, prior to executing social action 260 using avatar 225b at step 430, processor 111 may wait for a pre-determined period of time, such as 10-15 seconds, to determine if any social action is initiated by one of the clients and, if so, flowchart 400 may be terminated.

Referring to step 440 of flowchart 400 in FIG. 5, diagram 100 of FIG. 1, and diagram 200 of FIG. 2, step 440 of flowchart 400 comprises processor 111 receiving reply 270 from client 140a in response to social action 260 executed in step 430. As a result of receiving a personalized greeting, the user of client 140a may feel induced to send a return greeting, shown in FIG. 2 as reply 270, or "Hello Beth." As previously discussed, step 430 may be formulated so that reply 270 may be interpreted by avatar 225b or client 140b as an initial conversation starter, rather than as a response to social action 260. Including a general greeting that can be repeated as a response such as "hello" may create the desired effect. Additionally, adding personalization, such as the specific name of "Annie," may also help elicit reply 270 from client 140a controlling avatar 225a.

Referring to step 450 of flowchart 400 in FIG. 5, diagram 100 of FIG. 1, and diagram 200 of FIG. 2, step 450 of flowchart 400 comprises processor 111 rendering reply 270 received from step 440 using avatar 225a. As shown in display 250d, this may be accomplished by having avatar 225a speak reply 270, which may then be viewed by all other avatars in proximity, including avatar 225b and avatar 225c. Ideally as a result, avatars 225a and 225b may then naturally continue the social interaction by continuing the flow of the conversation. In one embodiment, if client 140b wants to provide a response to reply 270 that can be odd or confusing, e.g. "Hello" in response to "Hello Beth," processor 111 may suppress the response such that it is not perceivable by client 140a. Thus, normally shy and withdrawn users may be encouraged to communicate with others and gain greater enjoyment from their online experiences, which enriches the online community as a whole.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method for inducing a reply from a first client connected to a virtual world to facilitate a social interaction using a second client connected to the virtual world, the method comprising:
    locating, in the virtual world, an avatar of the second client in a proximity of an avatar of the first client;
    executing, in response to the locating, a social action using the avatar of the second client such that the social action is observable by the first client, wherein the social action is neither observable nor initiated by the second client while the avatar of the second client is being controlled by the second client and is observable by the second client;
    receiving the reply from the first client in response to the social action;
    rendering the reply from the first client using the avatar of the first client;
    receiving a response from the second client in response to the reply; and
    rendering the response from the second client using the avatar of the second client.

2. The method of claim 1, wherein the avatar of the second client is located in the proximity of the avatar of the first client when the avatar of the second client is visible on a display of the first client.

3. The method of claim 1, wherein the social action is observable by the first client using a display of the first client showing the virtual world.

4. The method of claim 1, wherein the social action includes communication by text or voice.

5. The method of claim 4, wherein the communication is regarding an event occurring in the virtual world.

6. The method of claim 4, wherein the communication is personalized for the first client.

7. The method of claim 4, wherein the communication includes a greeting that may be repeated in response to the communication, and wherein the reply includes the greeting.

8. The method of claim 7, wherein the greeting is hello.

9. The method of claim 1, wherein the social action includes a movement.

10. The method of claim 9, wherein the movement comprises a gesture.

11. The method of claim 9, wherein the movement comprises changing orientation.

12. The method of claim 1 further comprising prior to the locating:
    determining that the social action is acceptable using one or more factors.

13. The method of claim 12, wherein the one or more factors include a behavioral history of the second client.

14. The method of claim 12, wherein the one or more factors include a behavioral history of the first client.

15. The method of claim 1 further comprising prior to the receiving:
locating, in the virtual world, an avatar of a third client in a proximity of an avatar of the first client; and
executing the social action using the avatar of the third client such that the social action is observable by the first client but not observable by the third client.

16. The method of claim 15, wherein executing the social action using the avatar of the second client is not observable by the third client, and wherein executing the social action using the avatar of the third client is not observable by the second client.

17. A server for inducing a from a first client connected to a virtual world to facilitate a social interaction using a second client connected to the virtual world, the server comprising a processor configured to:
locate, in the virtual world, an avatar of the second client in a proximity of an avatar of the first client;
execute, in response to the locating, a social action using the avatar of the second client such that the social action is observable by the first client, wherein the social action is neither observable nor initiated by the second client while the avatar of the second client is being controlled by the second client and is observable by the second client;
receive the reply from the first client in response to the social action; and
render the reply from the first client using the avatar of the first client;
receive a response from the second client in response to the reply; and
render the response from the second client using the avatar of the second client.

18. The server of claim 17, wherein the social action includes communication by text or voice.

19. The server of claim 18, wherein the communication includes a greeting that may be repeated in response to the communication, and wherein the reply includes the greeting.

20. The server of claim 17, wherein prior to receiving the reply the processor is configured to:
locate, in the virtual world, an avatar of a third client in a proximity of an avatar of the first client; and
execute the social action using the avatar of the third client such that the social action is observable by the first client but not observable by the third client.

* * * * *

UNITED STATES PATENT AND TRADEMARK OFFICE
CERTIFICATE OF CORRECTION

| | | |
|---|---|---|
| PATENT NO. | : 8,881,030 B2 | Page 1 of 1 |
| APPLICATION NO. | : 12/583756 | |
| DATED | : November 4, 2014 | |
| INVENTOR(S) | : Jones et al. | |

It is certified that error appears in the above-identified patent and that said Letters Patent is hereby corrected as shown below:

In the claims,

Column 9, line 15, "a from" should be --a reply from--.

Signed and Sealed this
Nineteenth Day of May, 2015

Michelle K. Lee
*Director of the United States Patent and Trademark Office*